United States Patent [19]

Föller

[11] 4,226,362
[45] Oct. 7, 1980

[54] HIGH PRESSURE STEAM TRAP

[75] Inventor: Werner Föller, Stuhr, Fed. Rep. of Germany

[73] Assignee: GESTRA-KSB Vertriebsgesellschaft mbH & Co. KG, Bremen, Fed. Rep. of Germany

[21] Appl. No.: 66,991

[22] Filed: Aug. 16, 1979

[30] Foreign Application Priority Data

Aug. 19, 1978 [DE] Fed. Rep. of Germany ....... 2836400

[51] Int. Cl.³ .............................................. F16T 1/02
[52] U.S. Cl. ................................... 236/58; 236/93 A; 137/184
[58] Field of Search ..................................... 236/56–58, 236/92 R, 93 A, 99 J; 137/505.12, 184

[56] References Cited

U.S. PATENT DOCUMENTS

| 796,516 | 8/1905 | Humphrey | 137/184 |
|---|---|---|---|
| 1,644,109 | 10/1927 | Cashin | 236/58 |
| 1,656,372 | 1/1928 | Fitts | 236/93 A X |
| 1,694,641 | 12/1928 | Crosby | 236/56 |
| 1,952,823 | 3/1934 | Schlafman | 236/56 X |
| 2,229,529 | 1/1941 | Smith | 236/56 |
| 2,861,588 | 11/1958 | Cronk | 137/505.12 |

FOREIGN PATENT DOCUMENTS 1264449 3/1968 Fed. Rep. of Germany .

Primary Examiner—Albert J. Makay
Assistant Examiner—William E. Tapolcai, Jr.
Attorney, Agent, or Firm—Allison C. Collard; Thomas M. Galgano

[57] ABSTRACT

A high pressure steam trap is provided of the type which has at least two serially-connected and operated discharge control assemblies which are switched in series in the flow direction of the condensate, each of which includes a thermal control element which is exposed to the condensate to be discharged, a valve seat, and a throttle element which is actuated by the thermal control element for movement relative to the valve seat. Expansion capsules serve as the thermal control elements and these capsules contain an evaporation liquid, the steam pressure of which, measured at the same temperature, is higher than the steam pressure of the evaporation liquid in the successively-disposed expansion capsules downstream therefrom.

2 Claims, 1 Drawing Figure

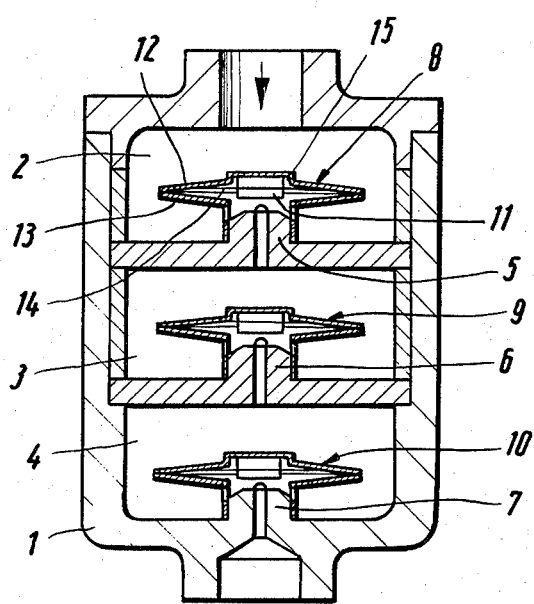

HIGH PRESSURE STEAM TRAP

The invention relates to a high pressure steam trap. More particularly, it relates to a high pressure, multistage steam trap of the type which has at least two serially-connected and operated discharge controls which encompass a thermal control element which is immersed in or exposed to the condensate to be discharged, a throttle element which is actuated by the thermal control element and an associated valve seat.

Since in this type of steam trap each throttle stage has its own thermal control element, such steam traps offer the advantage of a smooth, plural stage operation. They thereby afford a substantially wear- and tear-free pressure drop even with the smallest amount of condensate quantities for the throttle elements.

In a known embodiment of this high pressure steam trap (German Pat. No. 1,264,449) the thermal control elements consist of superimposed bimetallic pairs of discs which control the throttle element downstream of its valve seat. However, these discharge controls are disadvantageously influenced by the counter pressure which is exerted by the discharge control (which is switched in series in flow direction), due to a delayed opening and a reduced maximum flow-through quantity. Therefore, the known steam trap embodiment operates rather sluggishly and with a substantial subcooling and it has only a relatively low capacity.

It is therefore an object of this invention to provide a high pressure steam trap of the aforementioned type wherein a smooth stage-like pressure drop occurs from the smallest to the largest through-flow quantities and such that during condensate accumulation, a spontaneous and condensate subcooling-preventing opening of the discharge control occurs, and that after discharge of the condensate, an immediate closing of the discharge control occurs.

The object of the invention is obtained by the provision of a steam trap of the aforementioned type wherein expansion capsules are provided as the thermal control elements which always contain an evaporation liquid, the vapro pressure of which is higher than the vapor pressure of the evaporation liquid in the successive expansion capsule downstream therefrom, as measured at the same temperature.

As tests have shown, by using thermal expansion capsules (for example, bellows or siphon diaphragms) and the specific adjustment of the generated vapor pressures in the individual expansion capsules, the discharge controls open wide spontaneously without large condensate subcooling and, after discharging the condensate, close immediately. The discharging of the smallest condensate quantities occurs in this manner, so that the individual throttle stages, that is, the discharge controls, reduce the pressure proportionally. Therefore, a flow wear-and-tear on the throttle elements is reliably prevented with the smallest partial loads, as well as with large through-flow quantities.

In the drawing, a sectional view of one embodiment of the inventive high pressure steam trap is illustrated.

Referring now in detail to the drawing, the steam trap according to the invention includes a housing 1 which is provided with three successively arranged through-flow chambers 2, 3 and 4, each of which has an associated discharge valve seat 5, 6 and 7, respectively. A through-flow discharge control is provided in each through-flow chamber which encompasses an expansion capsule 8, 9 and 10, as well as a throttle element 11 which cooperates with a respective valve seat 5, 6 or 7 in the flow-through chambers 8, 9 and 10, respectively. The expansion capsules 8, 9 and 10, each consist of two rigid wall portions 12, 13 and a membrane 14 clamped therebetween. The latter supports the throttle element 11. The inner capsule space 15 which is formed between the wall portion 12 away from the valve seat and membrane 14 contains an evaporation liquid.

When the liquid flows through the flow-through chambers 2, 3 and 4 of the steam trap, the expansion capsules 8, 9 and 10 are immersed in condensate and are exposed to the temperature thereof. Thereby, an inner pressure is generated within the inner capsule chamber 15, the dimension of which is defined by the temperature and the vapor pressure curve of the evaporation liquid. This inner pressure acts on membrane 14 and, in turn, throttle element 11, causing the latter to be moved in the closing direction, relative to the valve seat, while, at the same time, the encompassing condensate pressure for the expansion capsule 8, 9 and 10 acts in the opening direction. When the temperature is so high that the inner pressure forces are higher than the condensate pressure forces, the individual discharge controls close.

In order to assure an immediate discharge of accumulated condensate quantities for large as well as small accumulations, with a proportional reduction of the condensate pressure in all throttle stages 11,5; 11,6; and 11,7, and to assure an immediate closing of the discharge control after the discharge of the condensate, it is required that the total control operation of the steam trap be defined by the input side of the discharge control 8, 11 and 5, and that control of the downflow controls 9, 11, 6 and 10, 11 and 7 be initiated by the input control. This is achieved by a specific adjustment of the evaporation liquids of the individual discharge controls with respect to their associated steam pressure. For this purpose, the inner capsule space 15 of the downstream expansion capsule 10 preferably contains an evaporation liquid, the vapor pressure of which is the same or higher than that of the condensate to be discharged, at the same temperature. In the other, upstream-located expansion capsules 9 or 8, an evaporation liquid is provided the vapor pressure pi of which follows the following relationship:

$$pi \geq \frac{pi_n}{1 - a_n/Aw_n}$$

In this formula, $pi_n$ represents the vapor pressure of the evaporation liquid in the associated downstream expansion capsule 10 or 9, $Aw_n$ the effective pressure face of membrane 14 of the mentioned associated expansion capsule and $a_n$ the opening cross section of the associated valve seat 7 or 6.

The different vapor pressures, as measured at the same temperature, from expansion capsule to expansion capsule may be obtained by using different evaporation liquids or by a different mixing ratio of solution degrees of the components of the same evaporation medium.

While only one embodiment of the present invention has been shown and described, it will be obvious that many modifications and changes may be made thereunto, without departing from the spirit and scope of the invention.

What is claimed is:

1. In a high pressure steam trap of the type which has at least two serially-connected and operated discharge control assemblies, each of which includes a thermal control element which is exposed to the condensate to be discharged, a valve seat, and a throttle element which is actuated by said thermal control element for movement relative to the valve seat, the improvement comprising:

said thermal control elements each comprising an expansion capsule which contains an evaporation liquid, the vapor pressure of the one expansion capsule is higher than the vapor pressure of the evaporation liquid in the successively-disposed expansion capsule downstream therefrom, measured at the same temperature as the one expansion capsule.

2. The steam trap according to claim 1, wherein said expansion capsules each have a movable wall portion, wherein said valve seat defines an opening and wherein said evaporation liquids of said expansion capsules have a vapor pressure pi which assumes the value:

$$pi \geq \frac{pi_n}{1 - a_n/Aw_n}$$

wherein $pi_n$ represents the vapor pressure, at the same temperature of the evaporation liquid of the expansion capsule downstream therefrom, $Aw_n$ represents the effective pressure face of said wall portion of the expansion capsule downstream therefrom and $a_n$ is the opening cross-section of the valve seat associated with said expansion capsule located downstream therefrom.

* * * * *